United States Patent
Heyn et al.

[11] Patent Number: 6,106,956
[45] Date of Patent: *Aug. 22, 2000

[54] BREATHABLE EXTRUDED POLYMER FILMS

[75] Inventors: Hans E. Heyn, Eureka Springs, Ark.; Kevin A. Brady, Cary, Ill.

[73] Assignee: Exxon Chemical Patents, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/013,715

[22] Filed: Jan. 26, 1998

[51] Int. Cl.$^7$ ....................................... B32B 27/32
[52] U.S. Cl. .......................... 428/516; 524/425; 524/451; 524/445; 524/449; 524/450; 524/432; 524/423; 524/448; 524/492; 524/437; 524/497; 524/35; 524/3; 524/586; 524/584
[58] Field of Search ..................................... 524/425, 451, 524/445, 449, 450, 432, 423, 448, 492, 437, 497, 35, 3, 586, 584; 428/516

[56] References Cited

U.S. PATENT DOCUMENTS

| | | | |
|---|---|---|---|
| 3,840,418 | 10/1974 | Sabee | 156/244 |
| 4,076,698 | 2/1978 | Anderson et al. | 526/348.6 |
| 4,153,664 | 5/1979 | Sabee | 264/289 |
| 4,223,059 | 9/1980 | Schwarz | 428/198 |
| 4,350,655 | 9/1982 | Hoge | 264/145 |
| 4,435,141 | 3/1984 | Weisner et al. | 425/131.1 |
| 4,472,328 | 9/1984 | Sugimoto et al. | 264/41 |
| 4,734,324 | 3/1988 | Hill | 428/317.3 |
| 4,777,073 | 10/1988 | Sheth | 428/155 |
| 5,032,450 | 7/1991 | Rechlicz et al. | 428/196 |

FOREIGN PATENT DOCUMENTS

| | | |
|---|---|---|
| 2115702 | of 0000 | United Kingdom . |
| WO96/19346 | 6/1996 | WIPO . |
| WO98/58799 | 12/1998 | WIPO . |

*Primary Examiner*—Robert Dawson
*Assistant Examiner*—Kuo-Liang Peng
*Attorney, Agent, or Firm*—Thomason, Moser & Patterson

[57] ABSTRACT

A polymer film comprising at least first and second contiguous and coextruded portions, wherein the first portion is extruded from a first polymer composition containing a filler material in an amount sufficient to increase the water vapor permeability of the first portion relative to the second portion, and the second portion is extruded from a second polymer composition such that a tensile strength of the second portion is greater than the tensile strength of the first portion. Such polymer films allow for highly vapor permeability, while providing portions with sufficient strength to allow for taping or attachment of fastening devices.

15 Claims, No Drawings

BREATHABLE EXTRUDED POLYMER FILMS

FIELD OF THE INVENTION

The invention relates to breathable extruded polymer films. More specifically, the invention is directed to polyolefin films coextruded to have two or more contiguous portions including a first portion that is formed of a filled polymer composition and is gas/vapor permeable and liquid impermeable, and at least one higher strength second portion formed of a polymer material in the absence of substantial amounts of filler material.

BACKGROUND OF THE INVENTION

The formation of "breathable" films that are gas/vapor permeable and liquid impermeable by stretching a precursor film containing a high level of filler material is known, and described, for example in U.S. Pat. No. 4,472,328, assigned to Mitsubishi Chemical Industries, Ltd. The breathable polyolefin film of the Mitsubishi patent is prepared from a polyolefin/filler composition having from 20 percent to 80 percent by weight of a filler material, such as calcium carbonate. A liquid or waxy hydrocarbon polymer elastomer such as a hydroxy-terminated liquid polybutadiene was described as producing a precursor film that could be monoaxially or bi-axially stretched to render the film breathable. The breathable film of the Mitsubishi patent is further mentioned in Great Britain Patent No. 2,115,702, assigned to Kao Corporation. The Kao patent describes the use of the breathable film of Mitsubishi as a diaper backsheet that prevents the leakage of liquids.

U.S. Pat. No. 4,350,655, assigned to Biax Fiber Film, ("the Biax '655 patent") describes a porous polyolefin film containing at least 50 percent by weight of a coated inorganic filler. The precursor film is formed without the addition of an elastomer by employing an inorganic filler that is surface coated with a fatty acid ester of silicon or titanium. The precursor film is then stretched between horizontally grooved rollers. Cold stretching of the precursor film at a temperature below 70° C. produces a porous film. The resulting films are generally both vapor and liquid permeable. However, Example 3 of the Biax patent describes a film that is vapor permeable and liquid impermeable.

A problem with polymer films rendered breathable by incorporation of filler materials is that the use of fillers also reduces the strength of the films. This reduction in tensile strength is disadvantageous in situations where the film must have sufficient strength to prevent tearing, for example to allow for attachment of tapes or the incorporation of fastening systems or elastic leg bands.

U.S. Pat. No. 3,840,418 to Sabee ("the Sabee '418 patent") describes a method for forming a sanitary product provided with sections having increased pin- or tape-retention strength in which a single synthetic resin is extruded by a selective extrusion process that selectively thickens the film web of resin at localized points where strength is needed. The Sabee patent does not discuss the use of filled polymer compositions and does not adjust the thickness of the various portions of the sanitary product to control vapor permeability.

One proposed manner of increasing the physical properties of filled and stretched polymer sheets is described in U.S. Pat. No. 4,777,073, assigned to Exxon Chemical Patents, Inc. ("the Exxon '073 patent"). The Exxon '073 patent describes the melt embossing of polymer/filler precursor films, such that portions of the film will have reduced thickness. When the films are activated by stretching, the portions of reduced thickness exhibit higher permeability and the portions with non reduced thickness exhibit higher tear strengths.

Although the films described in the Exxon '073 patent provide high permeability and necessary strength for the attachment of fasteners and the like, they do so at relative high thickness. High thickness increases the cost of the films and reduces the films' flexibility and soft feel. Films described in the Exxon '073 patent are also still deficient in strength in certain applications in consumer disposables, where the maker(s) of these disposables subject these films to secondary deformation steps.

With all the technical efforts focused on developing better film, there still remains a need for superior polymer film products. In view of this need, applicants have developed polymer films of substantially constant thickness, providing areas of improved vapor permeability and contiguous areas exhibiting increased tensile and tear strengths, which polymer films can be economically and simply formed in a single co-extrusion step.

SUMMARY OF THE INVENTION

The present invention provides a polymer film comprising at least first and second contiguous and coextruded portions, wherein the first portion is extruded from a first polymer composition containing a filler material in an amount sufficient to increase the vapor permeability of the first portion relative to the second portion, and the second portion is extruded from a second polymer composition such that the tensile and tear strengths of the second portion is greater than the tensile and tear strengths of the first portion. The present invention further provides for manufactured products, particularly diaper backsheets that are formed from such films.

DETAILED DESCRIPTION OF A PREFERRED EMBODIMENT

The polymer films of the present invention can be formed by extrusion using a segmented extrusion die of the type disclosed in U.S. Pat. No. 4,435,141, assigned to Polyloom Corporation of America ("the Polyloom '141 patent"), which is incorporated herein by reference. The die of the Polyloom '141 patent is provided with a grooved insert which, together with the interior surface of the die body members define separate alternating passages or channels through which the polymer flows. When fed by streams of at least two distinct polymer compositions the die allows for the extrusion a continuous film of contiguous portions formed of different polymer compositions.

The first portion of the extruded precursor film having the relatively high vapor permeability and relatively low tensile strength can be prepared from a first polymer composition comprising at least one polyolefin component, and a filler. The polyolefin composition can be any polyolefin suitable for film production including, but not limited to, polypropylene, copolymers of propylene, homopolymers and copolymers of ethylene including very low density polyethylene (VLDPE), low density polyethylene (LDPE), linear low density polyethylene (LLDPE), linear medium density polyethylene (LMDPE), high density polyethylene (HDPE) and mixtures and blends thereof A particularly preferred polyolefin is LLDPE. The use of LLDPE as the polyolefin component of the first polymer composition of this invention is preferred because of the material's high tear strength, ease of compounding and low cost.

Linear low density polyethylene (LLDPE) is produced by copolymerizing ethylene with $C_4$ to $C_{10}$ alpha-olefin. Generally, the preferred alpha-olefin includes those selected from butene-1, pentene-1, hexene-1, 4-methylpentene-1, heptene-1, and octene. The comonomers are present in amounts of up to 20 wt. %, usually between 3 and 14 wt. %. The polymerization may be conducted at low pressure, in the presence of a conventional Ziegler-Natta catalyst, a metallocene catalyst, or a combination thereof and may be carried out in a gas phase. Other polymerization schemes are also contemplated such as slurry, solution and high pressure. LLDPE produced by such a method will have a density of about 0.900 to about 0.935 g/cm$^3$ and a melt index (MI) of about 0.1 to about 5.0 grams per 10 minutes. Methods of manufacturing LLDPE are well known and described, for example, in U.S. Pat. No. 4,076,698.

Fillers suitable for incorporation into the first polymer composition used to form the first portion of the extruded precursor film which exhibits a relatively high vapor permeability may be any inorganic or organic material having a low affinity for, and a significantly lower elasticity than, the polyolefin component. The preferred filler is a rigid material having a hydrophobic surface or a material that is treated to have a hydrophobic surface. The preferred mean average particle size of the filler material is about 0.1 to about 10 micrometers for precursor films having a thickness of about 2 to about 6 mils. Examples of useful inorganic filler materials include calcium carbonate, talc, clay, kaolin, silica, glass, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, glass powder, zeolite, silica clay and other inorganic filler materials. Calcium carbonate is particularly preferred for low cost, whiteness, inertness and availability.

The inorganic fillers, such as calcium carbonate, are preferably surface treated to be hydrophobic. A hydrophobic filler material repels water and therefore reduces the agglomeration of the filler particles. Preferably, the surface coating also improves the ability of the filler to bind with the polyolefin, while simultaneously allowing the filler particles to be pulled away from the polyolefin under stress. A preferred coating is calcium stearate which is readily available and FDA compliant.

Organic filler materials such as wood powder, pulp powder and other cellulose-based powders may also be used. Polymer powders, such as Teflon® powder and Kevlar® powder (each of which are manufactured and sold by E. I. DuPont de Nemours Co.) are also suitable for use.

The amount of filler added to the polyolefin depends on the desired vapor permeability of the vapor permeable portion of the polymer film. However, it is believed that the formation of a vapor permeable (breathable) film portion requires that the amount of filler in the first polymer composition be at least 15 volume %, based on the total volume of filler and polyolefin (e.g. LLDPE/CaCO$_3$ having at least 38 wt. % CaCO$_3$). This minimum amount of filler is needed to insure the interconnection within the film of voids created at the situs of the filler particles during the "activation" of the precursor film, further described, infra. Further, it is believed that useful films cannot be made with an amount of filler in excess of about 35 vol. % (e.g., LLDPE/CaCO$_3$ having greater than about 65 wt. % CaCO$_3$). Higher amounts of filler may cause difficulty in compounding of the first polymer composition.

The polyolefin/filler-containing first polymer composition used to form the first vapor permeable portions of the inventive polymer films can be compounded in a number of conventional ways. The components may be brought into intimate contact by, for example, dry blending these materials and subsequently passing the overall composition through a compounding extruder. Alternatively, the polyolefin and filler material may be fed directly to a mixing device such as a compounding extruder, high shear continuous mixer, two roll mixer, or an internal mixer, such as a Banbury mixer. Overall, the objective is to obtain a uniform dispersion of the filler material in the polymer without agglomeration. This objective can be met by inducing sufficient shear and heat to cause the polyolefin to melt. At the same time, the time and temperature of mixing should be controlled in the conventional manner to avoid molecular weight degradation of the polymer.

Compounding of LLDPE and calcium carbonate that is surface treated with calcium stearate has been found to be improved by vacuum drying the mixture within the compounding extruder. The tear strength and softness of the vapor permeable portion of the polymer sheet can be improved by adding small amounts of elastomer to the first polymer composition. Suitable elastomers include natural rubber, ethylene-alpha olefin rubber (EPM), ethylene, alpha olefin-diene monomer rubber (EPDM), styrene-isoprene-styrene (SIS), styrene-butadiene-styrene (SBS), and butyl.

The second portion of the extruded precursor film having the relatively low vapor permeability and relatively high tensile strength (relative to the first portion) can be prepared from a second polymer composition comprising at least one polyolefin component and a relatively low amount, or no amount, of filler material. By relatively low, we intend that the second portion of the film has less than 15% by volume, preferably less than 10%, more preferably less than 5%, even more preferably less than 3%. The polyolefin can be the same or different from the polyolefin used to form the first polymer composition. As with the first composition, the use of LLDPE as the polyolefin of the second polymer composition is preferred. The second polymer composition has a relatively low amount, or no amount, of filler material. However, the second polymer composition can include a small amount of filler material, particularly titanium dioxide, added not to render the second portions gas permeable but to match the opacity of the formed second portions to that of the first portions so that the two contiguous portions cannot be visually distinguished. The polyolefin of the second portion may also be blended with an elastomer. Each of the first polymer composition and the second polymer composition may also contain additional conventional additives, such as antioxidants, anti-static agents, and colorants.

A precursor film having contiguous portions formed of the first polymer composition and second polymer composition (and, if desired, third, fourth, fifth compositions, etc.) can be extruded (e.g. by cast extrusion), by simultaneously feeding the first polymer compositions and second polymer composition to an extruder (e.g., a cast extruder) fitted with a sectioned extruder die of the type described in the Polyloom '141 patent supra. Advantageously, the temperature of each polymer stream is controlled so that the melt characteristics of the disparate feed stocks are similar. Because the first polymer composition contains a high amount of filler relative to the second polymer composition, it may be necessary to feed the first polymer composition and the second polymer composition to the extruder at different temperatures in order to obtain the desired melt characteristics and insure that the first and second portions of the precursor film are formed contiguously, and with a constant width. The melt temperature of the polymer compositions and the die temperature of the extruder will vary depending on the materials being extruded. Cast extrusion is preferred. When the preferred cast extrusion process is employed, the melt temperature of each of the polymer compositions and the extruder die temperature will preferably be about 175° C. (350° F.) to 235° C. (450° F.)

Confluence of the molten first polymer composition and second polymer composition feed stocks occurs in the die, and a multicomponent film having contiguous first portions and second portions, formed of the first polymer composition and second polymer composition, respectively, is extruded from the lip aperture of the extrusion die. The thickness of the precursor film, having contiguous first and second portions, can be varied by adjusting the die gap and/or the film takeaway speed. Preferably, the die gap for extruding a LLDPE resin will be set to provide a precursor film thickness of about 25.4 micrometer to 152.4 micrometers (1 to 6 mil), preferably from about 2 to 4 mil. The extruded precursor film may be taken up on a flat or engraved casting roller, as is conventional in the art. An engraved roller will deliver an embossed film of patterns well known in the art.

After extrusion, the precursor film can be "activated" by the stretching. Stretching of the precursor film causes voids and the interconnection within the sheet of the voids created at the situs of the filler particles, thereby increasing the vapor permeability of the material and reducing the thickness of the precursor polymer film. Because stretching generally only increases the vapor permeability of the material in the presence of particulate filler material, only the first portions of the precursor sheet formed of the filler-containing first polymer composition are rendered vapor permeable by stretching. The precursor film can be stretched either mono- or bi-axially, and stretching may be performed by tentering the film and/or by passing the precursor film around two rollers driven at different speeds, as described in the Exxon '073 patent, supra.

Preferably, the precursor film is stretched by passing the precursor film through a nip portion formed between interdigitating grooved rollers. The stretching of a polymer web by passage through interdigitated grooved rollers is disclosed, for example, in U.S. Pat. No. 4,223,059 assigned to Biax Fiberfilm Corporation ("the Biax '059 patent"), which is incorporated herein by reference. The Biax '059 discloses interdigitating rollers provided with grooves having a generally sine-wave shaped cross-section. Similarly, U.S. Pat. No. 4,153,664 to Sabee ("the Sabee '664 patent"), which is also incorporated herein by reference, discloses the stretching of a polymer film between a pair of ring-rollers having grooves with a variety of shapes. Stretching can be conducted at elevated temperatures below the melt point of the polymer compositions (e.g., from about 45 to about 65° C.), in which case the vapor permeability of the first portion (s) of the film will be inversely related to the stretching temperature. For example, the first portion(s) of a polymer film stretched at about 45° C. will have a higher degree of vapor permeability than an identical film stretched at a temperature of about 65° C.

The stretched precursor film may then optionally be heat set as described in the Exxon '073 patent. Heat setting stabilizes the stretched precursor film for any subsequent processing steps performed at temperatures higher than the stretching temperature. Heat setting can be conducted at any temperature that is above the stretching temperature and below the softening temperature of the polymer being used (e.g., 80 to 95° C.). Higher temperatures cause some stiffening of the polymer film (both the first portion(s) and the second portion(s)), and a slight reduction in the vapor permeability (of the first portion(s)). Therefore, heat setting at 80° C. will result in an overall softer polymer film which has more vapor permeable first portion(s) compared to a similar material heat set at 95° C.

The polymer films of the present invention can be used as a component in the formation of numerous commercial products, such as a backsheet for sanitary articles including diapers, training pants, incontinence pants, bed pads and other similar disposable items. The films of the present invention can find use in the construction of medical and surgical supplies, feminine care products, apparel and household furnishings, tape and packaging, and filtration membranes. For example, the breathable polymer films of the invention can be used to replace porous films in applications such as burn dressings, sterile packaging, rain coats, shoe linings, non-fogging packaging film, bacteria filters, water purification filters, and wind insulation for houses and buildings. Such films can also be used to form light weight camping and backpacking materials.

The size, number and configuration of relatively vapor permeable first portions and relatively high tensile strength second portions can be varied depending on the end use of the film. For example, when used as a diaper backsheet, the polymer film can be formed with a single, central first portion formed of the filler material-containing first polymer composition, and high tensile strength second and third portions formed of the second polymer composition contiguous to respective sides of the first portion in the machine direction of the film. The central first portion provides a vapor permeable region where needed, while the stronger side portions provide sufficient strength to accept fastening tapes, elastic gathers, or other fasteners. Similarly, when used to form a bed pad, a central region corresponding in position to the upper surface of a mattress can be formed as a vapor permeable first portion while side portions that wrap around the mattress and are provided with elastic holding members can be formed of the second, stronger polymer composition.

When used as a diaper backsheet, the first portion will have a high degree of vapor permeability relative to the second and third portions. The higher vapor permeability of the central first portion allows for the release of liquid vapor, decreasing the wet feel of the diaper interior and reducing the possibility of skin irritations, such as diaper rash. While the degree of vapor permeability can be set to a high level by use of a more highly filled first polymer composition, it is important that the first portion maintain a general resistance to liquid transmission. For diaper backsheet uses, the vapor permeability of the first portion measured as a water vapor transmission rate (WVTR) in accordance with ASTM F-1249 (incorporated herein by reference) can be greater than about 1000 to 4000 g/m$^2$/day at 38° C., 90% RH (e.g., 2300 g/m$^2$/day), while the WVTR of the unfilled polymer second portions will be less than about 400 g/m$^2$/day (e.g., less than 100 g/m$^2$/day).

The higher tensile strength of the second and third portions allows for the attachment of tapes or fasteners for securing the diaper, as well as elastic leg openings. The second and third portions of the polymer film can have a machine direction tensile strength at 5% strain (per ASTM D-882, incorporated herein by reference) of greater than about 1.54 n/cm (400 g/in.) (e.g., 1.93 n/cm (500 g/in.)), a dart drop impact strength (measured in accordance with ASTM-4272, incorporated herein by reference) greater than about 500 g (e.g., about 800 g), an ultimate tensile strength in the machine direction greater than about 6.75 n/cm (1750 g/in. (e.g., 7.72 n/cm (2000 g/in.)) (in accordance with ASTM-D-882), and an ultimate tensile strength in the transverse direction greater than about 5.02 n/cm (1300 g/in.) (e.g., 7.72 n/cm (2000 g/in.)). The filled, first portion, on the other hand, may have a machine direction tensile strength at 5% of less than about 1.54 n/cm (400 g/in.) (e.g., less than 0.96 n/cm (250 g/in.)), a dart drop impact strength of less than about 250 g (e.g., about 100 g), an ultimate tensile strength in the machine direction less than about 5.40 n/cm (1400 g/in.) (e.g., 4.82 n/cm (1250 g/in)), and an ultimate tensile strength in the transverse direction less than about 5.02 n/cm (1300 g/in.) (e.g., 3.86 n/cm (1000 g/in.)).

With the foregoing description of the invention, those skilled in the art will appreciate that modifications may be made to the invention without departing from the spirit thereof Therefore, it is not intended that the scope of the invention be limited to the specific embodiments illustrated and described above.

We claim:

1. A polymer film comprising at least a first coplanar portion contiguous to and adhering to a second coplanar portion, wherein said first portion is extruded from a first molten polymer composition containing a filler material in an amount sufficient to increase the water vapor permeability of said first portion relative to said second portion, and said second portion is concurrently extruded from a second molten polymer composition containing less filler material by volume than said first polymer composition, whereby said first portion has a water vapor permeability of greater than about 1000 g/m²/day and greater than the water vapor permeability of said second portion.

2. The polymer film of claim 1, wherein said first coplanar portion is coextruded with, and positioned between said second coplanar portion and a third coplanar portion extruded from said second polymer composition, said first portion being contiguous to and adhering to each of said second portion and said third portion, each said first, second, and third portion being concurrently coextruded in the machine direction.

3. A polymer film comprising at least a first coplanar portion contiguous to and adhering to a second coplanar portion, wherein said first portion is extruded from a first molten polymer composition containing at least about 15% filler material by volume, and said second portion is concurrently extruded from a second molten polymer composition containing up to about 15% filler material by volume, whereby said first portion has a water vapor permeability greater than the water vapor permeability of said second portion.

4. The polymer film of claim 1, wherein the polymer component of each of said first polymer composition and said second polymer composition is a polyolefin.

5. The polymer film of claim 4, wherein said polyolefin of said first polymer composition and said second polymer composition is the same.

6. The polymer film of claim 4, wherein said polyolefin is selected from the group consisting of: low density polyethylene, linear low density polyethylene, linear medium density polyethylene, high density polyethylene, polypropylene homopolymer, a polypropylene copolymer, and mixtures thereof.

7. The polymer film of claim 4 wherein said polyolefin is linear low density polyethylene.

8. The polymer film of claim 1, wherein said filler material is selected from the group consisting of: calcium carbonate, talc, clay, kaolin, silica, diatomaceous earth, magnesium carbonate, magnesium sulfate, barium sulfate, calcium sulfate, aluminum hydroxide, zinc oxide, calcium oxide, magnesium oxide, titanium oxide, alumina, mica, glass powder, zeolite, silica clay, wood powder, pulp powder, cellulose and mixtures thereof.

9. The polymer film of claim 8, wherein said filler material is calcium carbonate.

10. The polymer film of claim 1, wherein said first polymer composition comprises about 15 to about 35 vol % of said filler material.

11. The polymer film of claim 2, wherein said first portion has a water vapor transition rate of about 1000 to about 4000 g/m²/day, and each of said second portion and third portion have a water vapor transition rate of less than about 400 g/m²/day.

12. The polymer film of claim 11, wherein said first portion has a machine direction tensile strength at 5% strain below 0.96 n/cm (250 g/in) and each of said second portion and said third portion have a machine direction tensile strength at 5% strain greater than 1.54 n/cm (400 g/in).

13. The polymer film of claim 11, wherein said first portion has a dart drop impact strength of less than about 250 g, and each of said second portion and third portion has a dart drop impact strength greater than about 500 g.

14. The polymer film of claim 12, wherein said first portion has an ultimate tensile strength in the machine direction less than 5.4 n/cm (1400 g/in) and an ultimate tensile strength in the transverse direction less than 4.25 n/cm (1100 g/in), and each of said second portion and said third portion have an ultimate tensile strength in the machine direction greater than 6.75 n/cm (1750 g/in) and an ultimate tensile strength in the transverse direction greater than 5.02 n/cm (1300 g/in).

15. A diaper backsheet formed of the polymer film of claim 1.

* * * * *

UNITED STATES PATENT AND TRADEMARK OFFICE
CERTIFICATE OF CORRECTION

PATENT NO.    : 6,106,956
DATED         : August 22, 2000
INVENTOR(S)   : Heyn et al.

It is certified that error appears in the above-identified patent and that said Letters Patent is hereby corrected as shown below:

Column 3,
Line 25, please change "micrometers" to -- micrometers (microns) --.

Column 6,
Lines 63 and 67, please change "n/cm" to -- N/cm --.

Column 7,
Lines 1, 3, 4, 6, 7, 9, 10 and 12, please change "n/cm" to -- N/cm --.

Column 8,
Lines 27 and 29, please change "water vapor transition" to -- water vapor transmission --.
Lines 33, 35, 42, 44, 46 and 48, please change "n/cm" to -- N/cm --.

Signed and Sealed this

Seventeenth Day of June, 2003

JAMES E. ROGAN
*Director of the United States Patent and Trademark Office*